US008428973B1

(12) United States Patent
Hopkins, III (10) Patent No.: US 8,428,973 B1
(45) Date of Patent: Apr. 23, 2013

(54) SYSTEMS AND METHODS FOR AUTOMATICALLY DISABLING MOBILE DEVICE USAGE WHILE DRIVING

(75) Inventor: John C. Hopkins, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 489 days.

(21) Appl. No.: 12/474,589

(22) Filed: May 29, 2009

(51) Int. Cl.
*G06Q 40/00* (2012.01)
(52) U.S. Cl.
USPC ...................................... 705/4; 705/2; 705/35
(58) Field of Classification Search ........................ 705/4
See application file for complete search history.

(56) References Cited

U.S. PATENT DOCUMENTS

| | | | | |
|---|---|---|---|---|
| 6,064,970 | A * | 5/2000 | McMillan et al. | 705/4 |
| 6,502,022 | B1 | 12/2002 | Chastain | |
| 6,690,940 | B1 * | 2/2004 | Brown et al. | 455/456.4 |
| 2005/0255874 | A1 * | 11/2005 | Stewart-Baxter et al. | 455/550.1 |
| 2007/0270122 | A1 | 11/2007 | Ewell | |
| 2008/0268767 | A1 * | 10/2008 | Brown et al. | 455/1 |

OTHER PUBLICATIONS

"A Deadly Obsession: Hooked on Cell Phones", Sherrill Sellman, Feb./Mar. 2005, p. 60-61.*
Chapman, Matt: "Cell Phone Jammer Ends Texting While Driving, Son / Teenagers Not Happy!", Tilt Mobility, Dec. 12, 2008, pp. 1-10.
Foy, Paul: "New Technology Attempts to Stop Phone Use in Cars", Manufacturing.net, Jan. 19, 2009, pp. 1-4.

* cited by examiner

*Primary Examiner* — Hai Tran
(74) *Attorney, Agent, or Firm* — Brooks, Cameron & Huebsch, PLLC (57) ABSTRACT

A system implemented on one or more processors for automatically disabling mobile device usage while driving may comprise at least one subsystem configured for determining whether a mobile device is traveling at a speed greater than a predetermined threshold and at least one subsystem configured for disabling a functionality of the mobile device if it is determined that the mobile device is traveling at a speed greater than the predetermined threshold. The at least one subsystem configured for determining whether a mobile device is traveling at a speed greater than a predetermined threshold may comprise at least one subsystem configured for receiving output data from an accelerometer on the mobile device and at least one subsystem configured for using said data to determine a current speed of the mobile device.

27 Claims, 9 Drawing Sheets

SYSTEMS AND METHODS FOR AUTOMATICALLY DISABLING MOBILE DEVICE USAGE WHILE DRIVING

BACKGROUND

Currently, www.onlinelawyersource.com states that "Auto accident fatalities are the leading cause of death for young people in America. Teenagers comprise less than 7% of the total population but are involved in 14% of all auto accidents." The article further states that research by Ford Motor Company revealed that teenage drivers are four times more distracted when using a cell phone compared to adult drivers. Further statistics reveal that 80% of teens have cell phones, 48% of teens admit talking on cell phones while driving and 61% admit to texting while driving.

Teen cell phone and mobile device usage while driving adversely affects the bottom line of insurance companies in the form of loss due to preventable accidents. To combat automobile accidents caused by inattentive drivers many states have, and are currently passing, legislation illegalizing the use of cell phones while driving.

Currently, no systems or methods exist to help insurance companies accurately assign a risk premium associated with mobile device usage while driving to those who carry out this dangerous activity such that no risk premium is assigned unduly to those who are not guilty of the activity.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for automatically disabling mobile device usage while driving are described herein. For several embodiments, a system implemented on one or more processors for automatically disabling mobile device usage while driving may comprise at least one subsystem configured for determining whether a mobile device is traveling at a speed greater than a predetermined threshold and at least one subsystem configured for disabling a functionality of the mobile device if it is determined that the mobile device is traveling at a speed greater than the predetermined threshold. The at least one subsystem configured for determining whether a mobile device is traveling at a speed greater than a predetermined threshold may comprise at least one subsystem configured for receiving output data from an accelerometer on the mobile device and at least one subsystem configured for using said data to determine a current speed of the mobile device.

Other features and embodiments are described below.

BRIEF DESCRIPTION OF THE DRAWINGS

Systems and methods for automatically disabling mobile device usage while driving are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
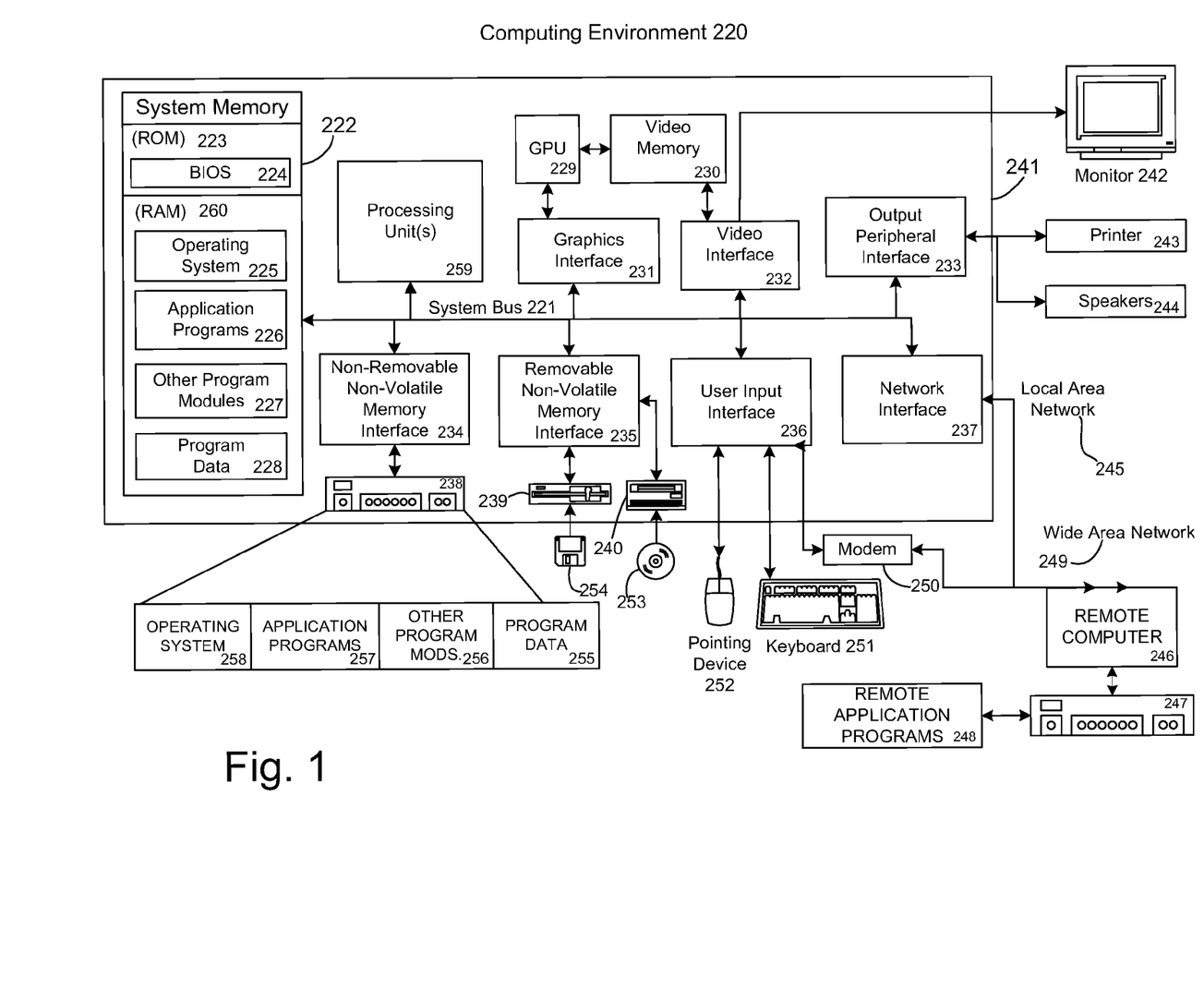
FIG. 1 is a block diagram representing an exemplary computing environment suitable for use in conjunction with implementing aspects of systems and methods for automatically disabling mobile device usage while driving.

Referring next to FIG. 1, shown is a block diagram representing an exemplary computing environment suitable for use in conjunction with implementing the processes described below. For example, the computer-executable instructions that carry out the processes and methods for automatically disabling mobile device usage while driving may reside and/or be executed in aspects of such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, video interface 232 and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
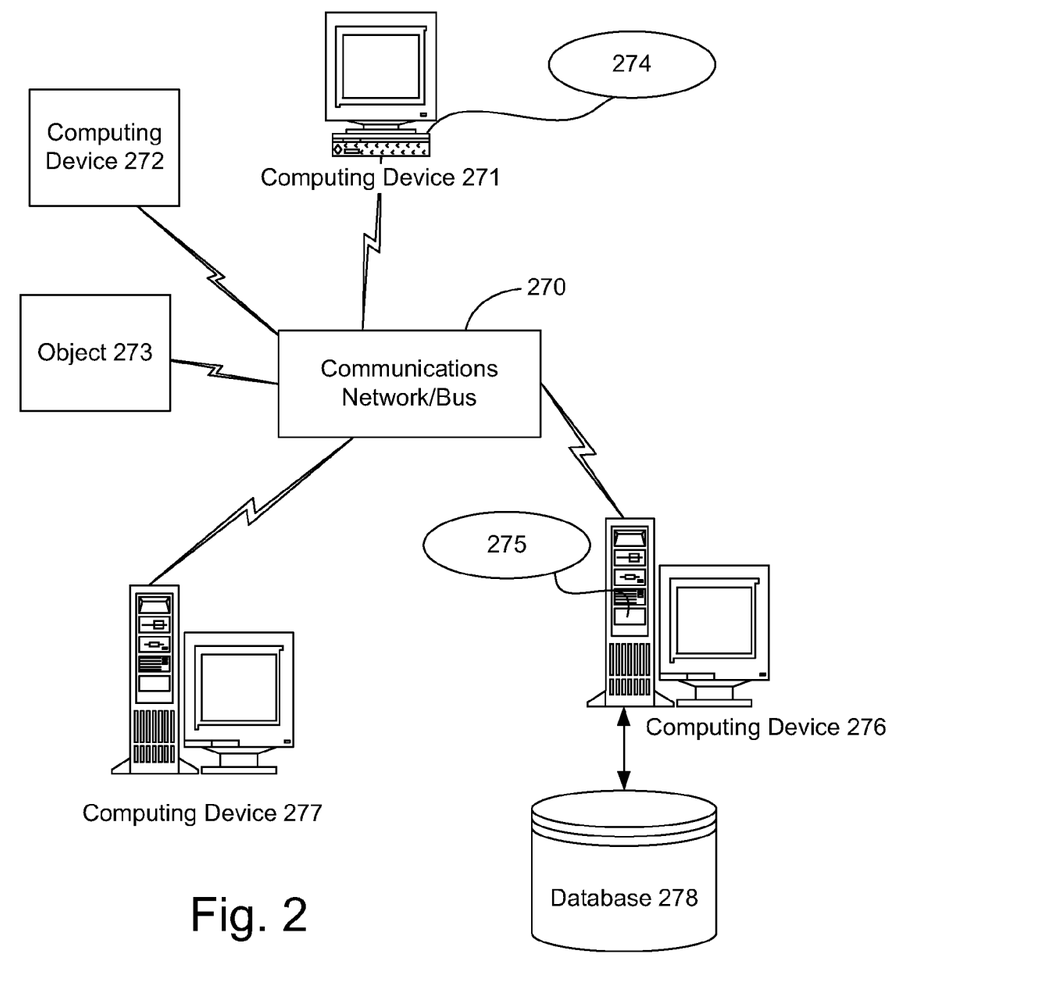
FIG. 2 illustrates an exemplary networked computing environment in which many computerized processes may be implemented to provide systems and methods for automatically disabling mobile device usage while driving.

Referring next to FIG. 2, shown is an exemplary networked computing environment in which many computerized processes may be implemented to perform the processes described below. For example, various clients on the network of FIG. 2 may be using and/or implementing systems and methods for automatically disabling mobile device usage while driving. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
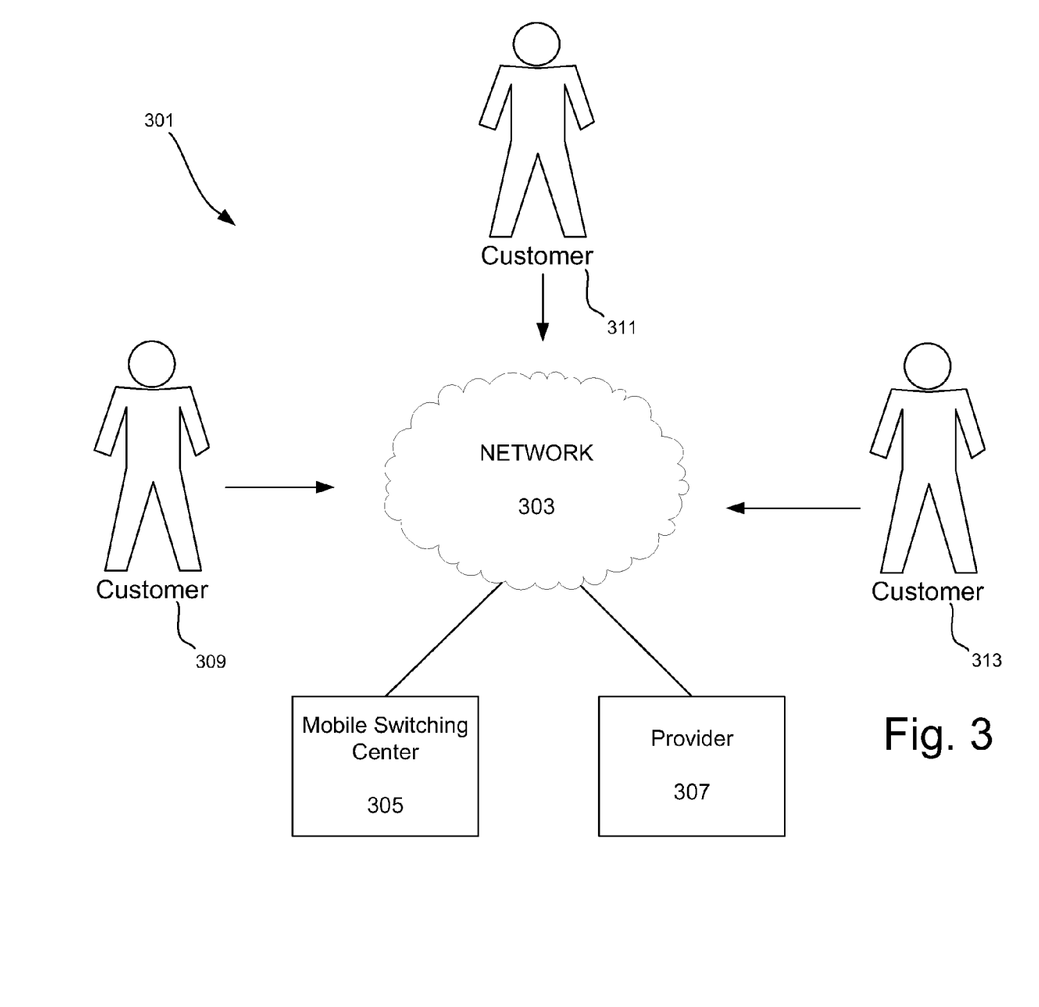
FIG. 3 is a block diagram of an example system for providing a financial transaction based on data received from systems and methods for automatically disabling mobile device usage while driving.

Referring next to FIG. 3 shown is a block diagram of an example system 301 for providing a financial transaction based on data received from systems and methods for automatically disabling mobile device usage while driving. Shown are a network 303, a mobile switching center 305, a service provider 307, and a plurality of example customers 309 311 313. The mobile switching center 305, service provider 307, and plurality of example customers 309 311 313 are all operably connected to each other through the network 303 such that they may be in remote communication with each other. The plurality of example customers 309 311 313 may be operably connected to the network 303 via a personal computer or one or more mobile devices. A mobile device as described herein may include, but is not limited to, one or a combination of the following types of wireless devices: cellular phone, smart phone, satellite phone, personal digital assistant (PDA), mobile computing devices, handheld computers, and other mobile communication devices.

The network 303 may be one or a combination of the following types of networks: computer communications network, the Internet, an intranet, data communications network, close or long range wireless network, satellite network, cellular network, telephone network, radio network, etc. The system 301 may be used to provide a plurality of financial transactions including but not limited to banking transactions, investment transactions; insurance transactions and a plurality of other financial transactions. The provider may be a financial services provider such as an Integrated Financial Services company, for example, or anyone performing banking, investing, financial or insurance transactions for customers 309 311 313. The plurality of customers 309 311 313 may be operably connected to the network 303 via their data input and communication devices, including mobile devices. One or more of the customers 309 311 313 may have a personal computer or mobile device connected to the network 303 such as the Internet, in order to facilitate communications between the customers 309 311 313 and the provider 307. For example, data from systems and methods for automatically disabling mobile device usage while driving may be received from the mobile switching center 305 (or from the customers directly 309 311 313) through the network 303 to the provider 307. For example, this data may include, but is not limited to information regarding whether and when the customers 309 311 313 were driving over a predetermined speed or driving while operating their mobile device.

Figure 4:
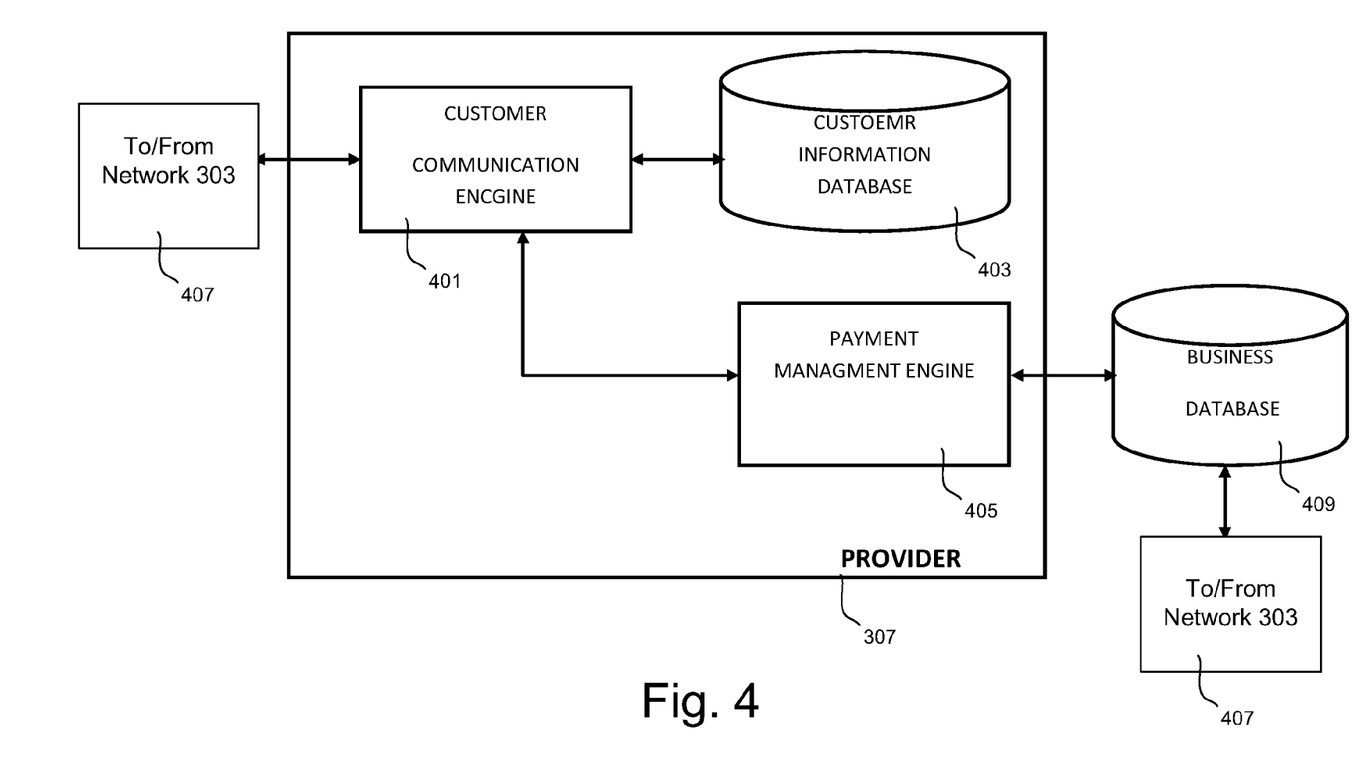
FIG. 4 is a block diagram of the example services provider in the system of FIG. 3 for providing a financial transaction based on data received from systems and methods for automatically disabling mobile device usage while driving.

Referring next to FIG. 4, shown is a block diagram of the example services provider 307 in the system of FIG. 3 for providing a financial transaction based on data received from systems and methods for automatically disabling mobile device usage while driving. The provider 307 may comprise a customer communications engine 401 connected to the network 303 of FIG. 3 (e.g., the Internet) via network connections 407 operable for sending and receiving data to and from customers 309 311 313. The payment management engine 405 may have access to customer accounts in customer information database 403 via the customer communications engine 401 in order to perform financial transactions. The payment management engine 405 may also have access to business rules in business database 409 for performing financial transactions. Both the customer information database 403 and business database 409 may receive information via network connections 407 from systems and methods for automatically disabling mobile device usage while driving via the mobile switching center 305 (or from the customers directly 309 311 313) through the network 303. For example, this data may include, but is not limited to information regarding whether and when the customers 309 311 313 were driving over a predetermined speed or driving while operating their mobile device.

Figure 5:
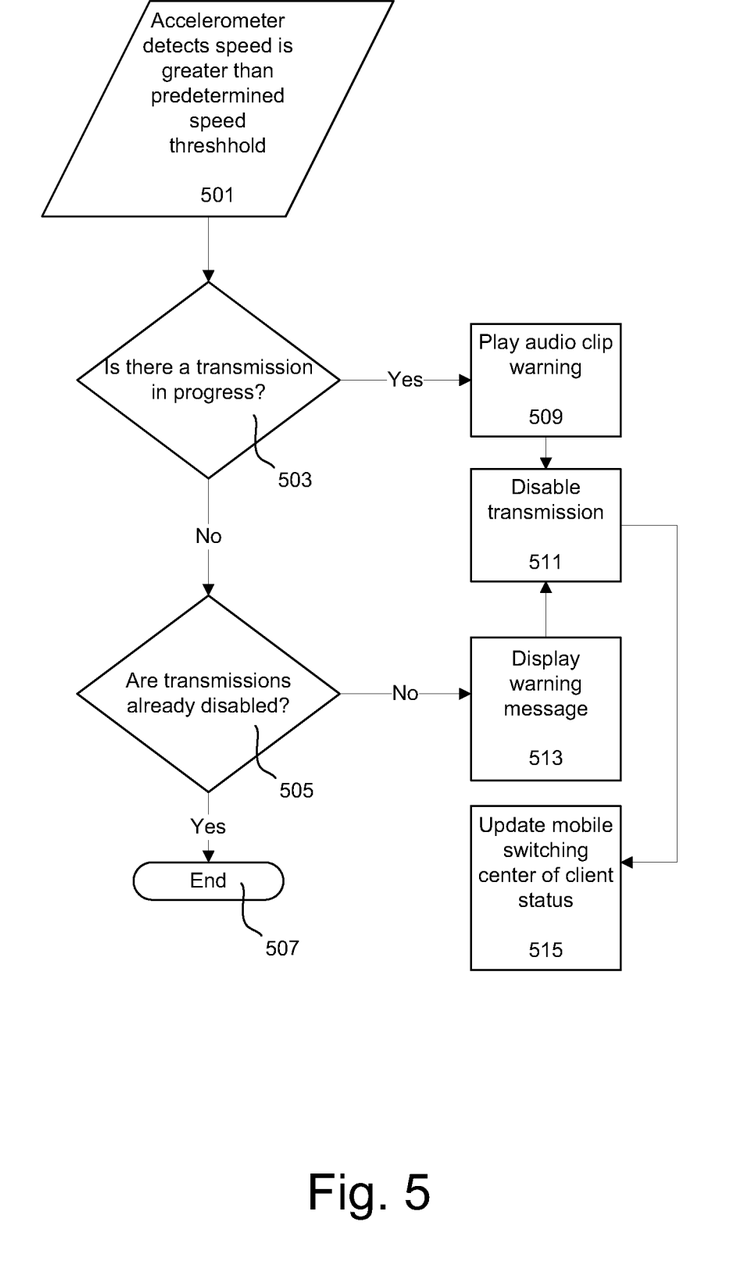
FIG. 5 is a flowchart illustrating an example process for restricting mobile device functionality according to systems and methods for automatically disabling mobile device usage while driving.

Referring next to FIG. 5, shown is a flowchart illustrating an example process for restricting mobile device functionality according to systems and methods for automatically disabling mobile device usage while driving. The process may monitor output from an accelerometer on or inside a mobile device of a customer. An accelerometer is a device for measuring acceleration and gravity and velocity. Single and multi-axis models are available to detect magnitude and direction of the acceleration as a vector quantity, and can also be used to sense orientation, vibration and shock. Accelerometers are increasingly present in portable electronic devices (such as mobile devices) and video game controllers. An accelerometer measures the acceleration and gravity it experiences typically expressed in SI units meters/second2 (m/s2)

or popularly in terms of g-force. Velocity can therefore be measured by detecting an initial acceleration up to detecting deceleration in the opposite direction. Conceptually, an accelerometer behaves as a damped mass on a spring. When the accelerometer experiences an external force such as gravity, the mass is displaced until the external force is balanced by the spring force. The displacement is translated into acceleration.

Modern accelerometers are often small micro electro-mechanical systems (MEMS), and are indeed the simplest MEMS devices possible, consisting of little more than a cantilever beam with a proof mass (also known as seismic mass). Damping results from the residual gas sealed in the device. As long as the Q-factor is not too low, damping does not result in a lower sensitivity.

Under the influence of external accelerations the proof mass deflects from its neutral position. This deflection is measured in an analog or digital manner. Most commonly, the capacitance between a set of fixed beams and a set of beams attached to the proof mass is measured. This method is simple, reliable, and inexpensive. Integrating piezoresistors in the springs to detect spring deformation, and thus deflection, is a good alternative, although a few more process steps are needed during the fabrication sequence. For very high sensitivities quantum tunneling is also used; this requires a dedicated process making it very expensive. Optical measurement has been demonstrated on laboratory scale.

Another, far less common, type of MEMS-based accelerometer contains a small heater at the bottom of a very small dome, which heats the air inside the dome to cause it to rise. A thermocouple on the dome determines where the heated air reaches the dome and the deflection off the center is a measure of the acceleration applied to the sensor.

Most micromechanical accelerometers operate in-plane, that is, they are designed to be sensitive only to a direction in the plane of the die. By integrating two devices perpendicularly on a single die a two-axis accelerometer can be made. By adding an additional out-of-plane device three axes can be measured. Such a combination always has a much lower misalignment error than three discrete models combined after packaging. Micromechanical accelerometers are available in a wide variety of measuring ranges, reaching up to thousands of g's. The designer must make a compromise between sensitivity and the maximal acceleration that can be measured.

When the monitoring program determines 501 from the accelerometer output that the mobile device's velocity exceeds a pre-established threshold, it is then determined 503 whether there is a current transmission on the mobile device in progress (e.g., a phone call in progress). If there is not a current transmission in progress, it is then determined 505 whether transmissions are already disabled. If transmissions are already disabled, then the process ends 507 with leaving the transmissions disabled.

If there is a transmission in progress, then a warning is given 509 (such as playing an audio warning clip) that transmissions are about to be disabled. This warning may be played on the mobile device, for example, and may give the customer a predetermined time to end the transmission (e.g., end the phone call) before automatically disabling 511 transmissions. The disabling of transmission may be performed via an internal switch triggered within the mobile device to shut off particular communications, or may be performed at the mobile switching center 305 by intercepting or blocking certain types of transmissions from the mobile device at the mobile switching center 305. The mobile switching center 305 (shown in FIG. 3) is then updated as to the status of the customer's mobile device and other data regarding whether and when the customer was driving over a predetermined speed or driving while operating their mobile device may also be communicated to the mobile switching center 305. If there is not a transmission in progress and transmissions are not already disabled on the device then a warning message may be displayed 513 on the mobile device warning that transmission is about to be disabled and thereafter transmissions will be automatically disabled 511 as above. The disabling of transmissions may include disabling certain functionality on the mobile device including one or more of the following types of functionality: voice, text messaging, e.g., short message service (SMS), multimedia messaging service (MMS), email, web browsing, chat functionality, video playback, sound, camera functionality, airplane mode, mobile device power, all mobile device functionality. Also, a message may be automatically relayed to a person calling or sending other communications to the mobile device indicating that the customer is driving or otherwise busy and cannot respond if transmissions are currently disabled.

Figure 6:
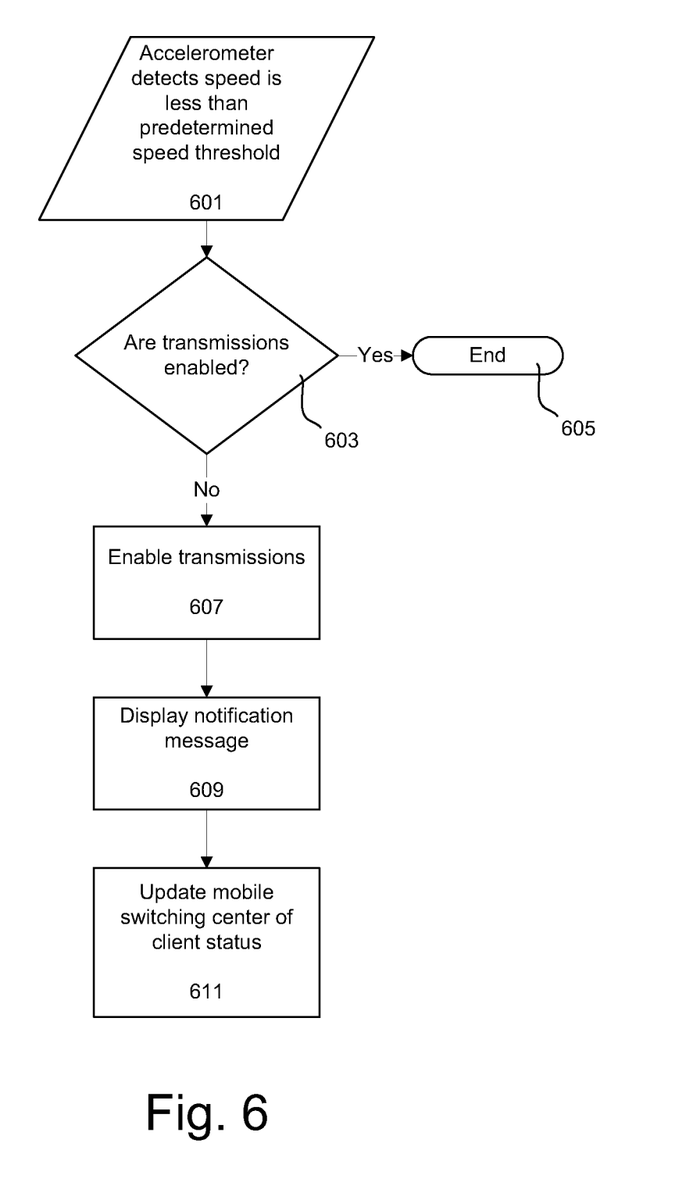
FIG. 6 is a flowchart illustrating an example process for restoring mobile device functionality according to systems and methods for automatically disabling mobile device usage while driving.

The process above may be stored in memory and operate on a processor within the mobile device, for example, and further embodiments may disable voice and text operations via a permission function called by the send command on the mobile device that would only allow the send command to operate if the current speed of the mobile device is not over a predetermined threshold. In a further embodiment a call to '911' would be allowed by the permission function and in the process described above Referring next to FIG. 6, shown is a flowchart illustrating an example process for restoring mobile device functionality according to systems and methods for automatically disabling mobile device usage while driving. First, the accelerometer in or on the mobile device detects 601 the mobile device is at a speed less than a predetermined speed threshold. It is then determined 603 whether transmissions are currently enabled on the device. If transmissions are currently enabled, then the process ends 605, leaving the transmissions enabled. If transmissions are not currently enabled, then transmissions are enabled 607 on the device and a notification message is displayed 609 indicating transmissions are enabled or restored. The mobile switching center 305 (shown in FIG. 3) is then updated 611 as to the status of the customer's mobile device and other data regarding whether and when the customer was driving over a predetermined speed or driving while operating their mobile device may also be communicated to the mobile switching center 305.

In one embodiment, the accelerometer included in the device architecture of the mobile device notifies the Mobile Telephone Switching Office (MTSO) 305 (i.e., mobile switching center) when the device is traveling faster than a specified threshold velocity. In this embodiment the MTSO includes a flag in the frequency usage transaction record indicating that the device was traveling at, or beyond, a threshold speed limit. In the present embodiment a provider insurance company 307 may retrieve customer call records from the MTSO 305 and other data including, but not limited to information regarding whether and when the customer was driving over a predetermined speed or driving while operating their mobile device. This data may be used in an automobile insurance premium adjustment of the customer. For example, this automobile insurance premium adjustment may be effected automatically via the payment management engine 405 shown FIG. 4. Also, discovery of calls while traveling may be used in automobile insurance premium adjustment. Likewise, the MTSO may notify the customer's automobile insurance company that the customer was using a cell phone in a moving vehicle and the customer mobile device may notify the customer's automobile insurance company server via SMS or mail exchange server, for example.

In a further embodiment, detection of mobile device in moving vehicles may be accomplished through Mobile Switching Center (MSC) Visitor Location Registry (VLR) entries. In this embodiment, cell usage while driving would be identifiable via analyzing location data against usage time data. Location data may be obtained through a global positioning system (GPS) on the device or other methods of location such as triangulation.

In a further embodiment, a method may allow law enforcement to discover if the driver of an automobile was communicating via a mobile device while driving before being pulled over or at the time of a vehicle accident. Law enforcement may be notified of cell phone use in a vehicle with GPS coordinates in order to apprehend the driver violating cell phone usage laws.

In an embodiment, a customer may purchase, lease, or rent an accelerometer governed phone for use by a dependent of driving age. In return for proof of usage (e.g. billing records) the customer may receive a premium discount on the dependent's automobile insurance policy. In an embodiment phone service payment through a company sponsored "Web Bill Pay" program may suffice as proof of usage. The premium discount is rewarded for accelerometer governed phone usage as it effectively reduces the potential of voice and/or data transmission on the part of the dependent driver while operating a moving vehicle. Research indicates that by preventing teenage customer voice and/or data transmission while driving will reduce the losses incurred as a result of teenage involved automobile accidents.

Figure 7:
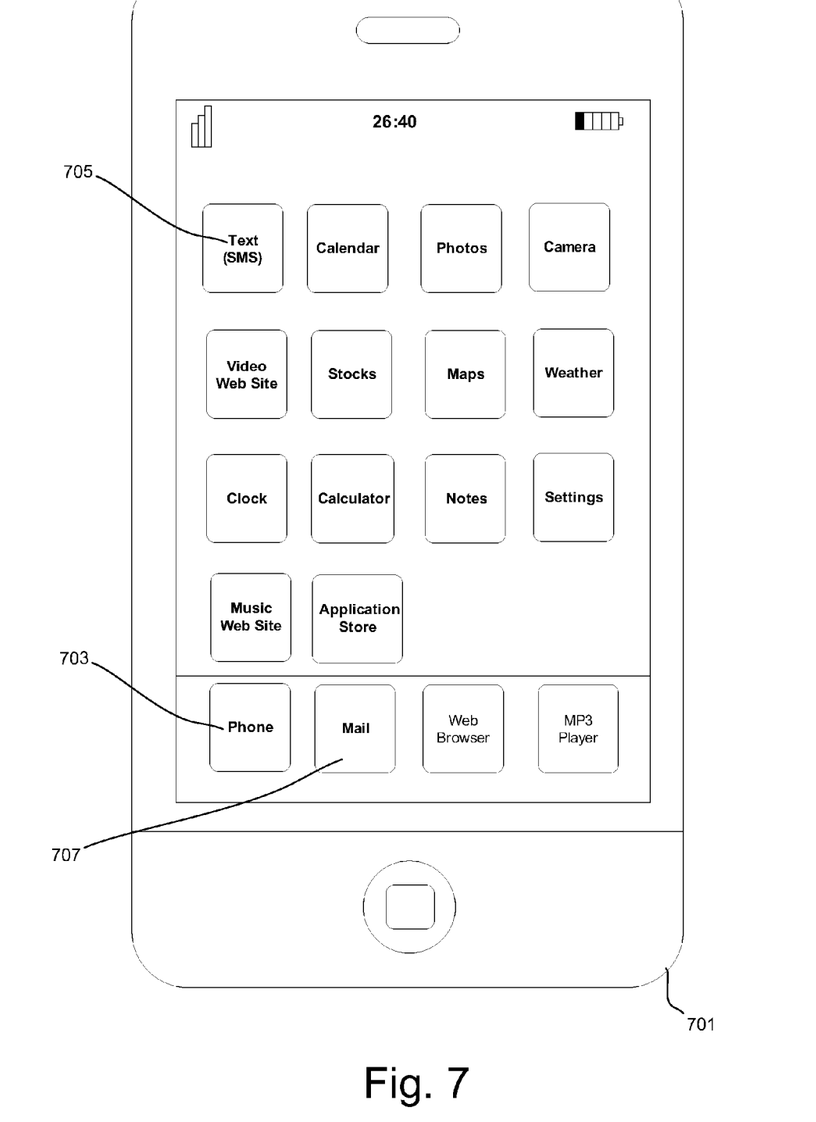
FIG. 7 is a diagram of an example mobile device before having its usage disabled according to systems and methods for automatically disabling mobile device usage while driving.

Referring next to FIG. 7, shown is a diagram of an example mobile device 701 before having its usage disabled as described above according to systems and methods for automatically disabling mobile device usage while driving. Note that the display of the mobile device 701 shows icons for the phone 703, text messaging 705 and email 707 functionality as being operational.

Figure 8:
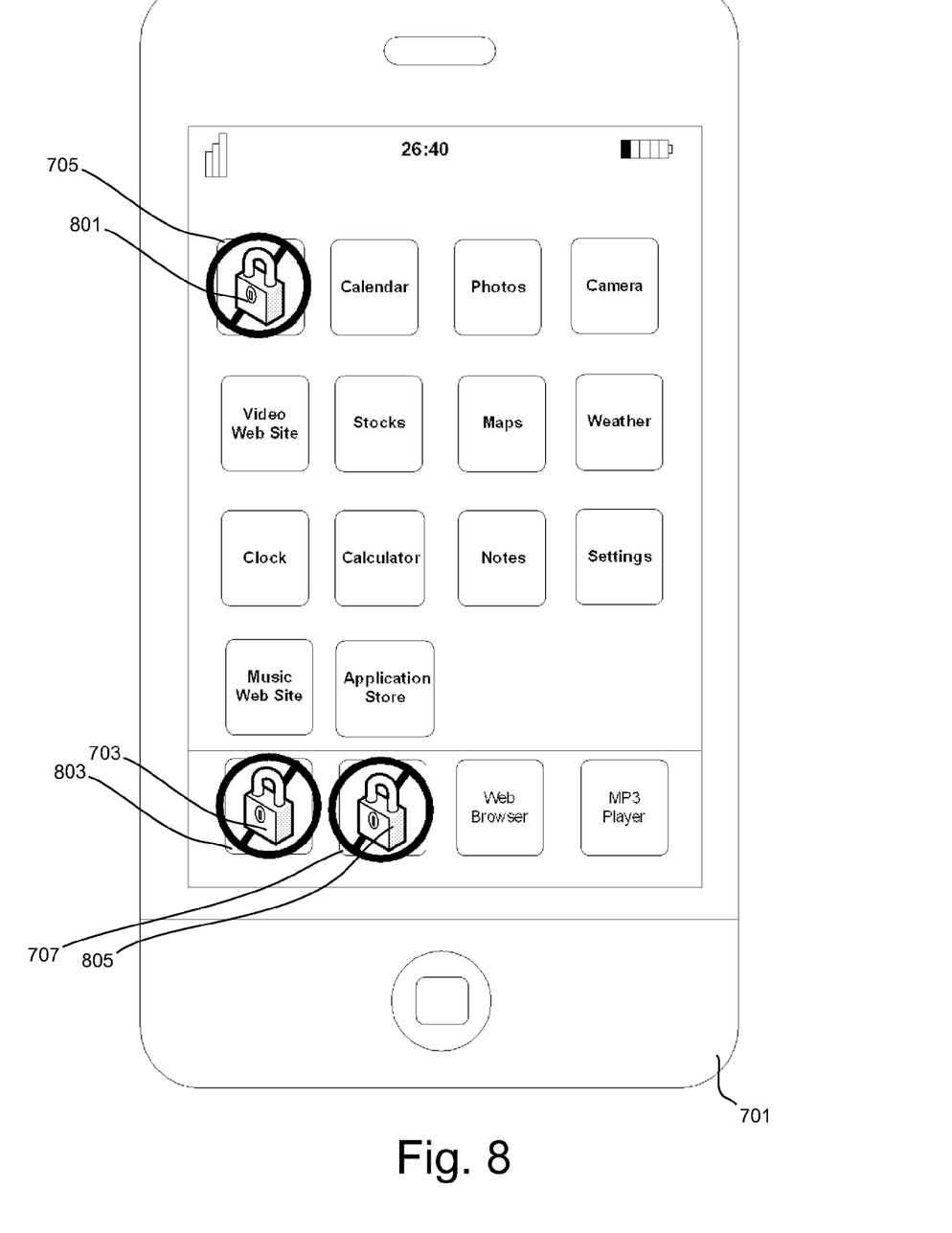
FIG. 8 is a diagram of an example mobile device which has had its usage disabled according to systems and methods for automatically disabling mobile device usage while driving.

Referring next to FIG. 8, shown is a diagram of an example mobile device 701 which has had its usage disabled as described above according to systems and methods for automatically disabling mobile device usage while driving. Note that the display of the mobile device 701 shows the icons for the phone 703, text messaging 705 and email 707 functionality as being disabled by images 801 803 805 each comprising a circle with a line through it and a lock image over the phone 703, text messaging 705 and email 707 icons. However, other indications and images may be displayed to indicating certain functionality or features on the mobile device have been disabled.

Figure 9:
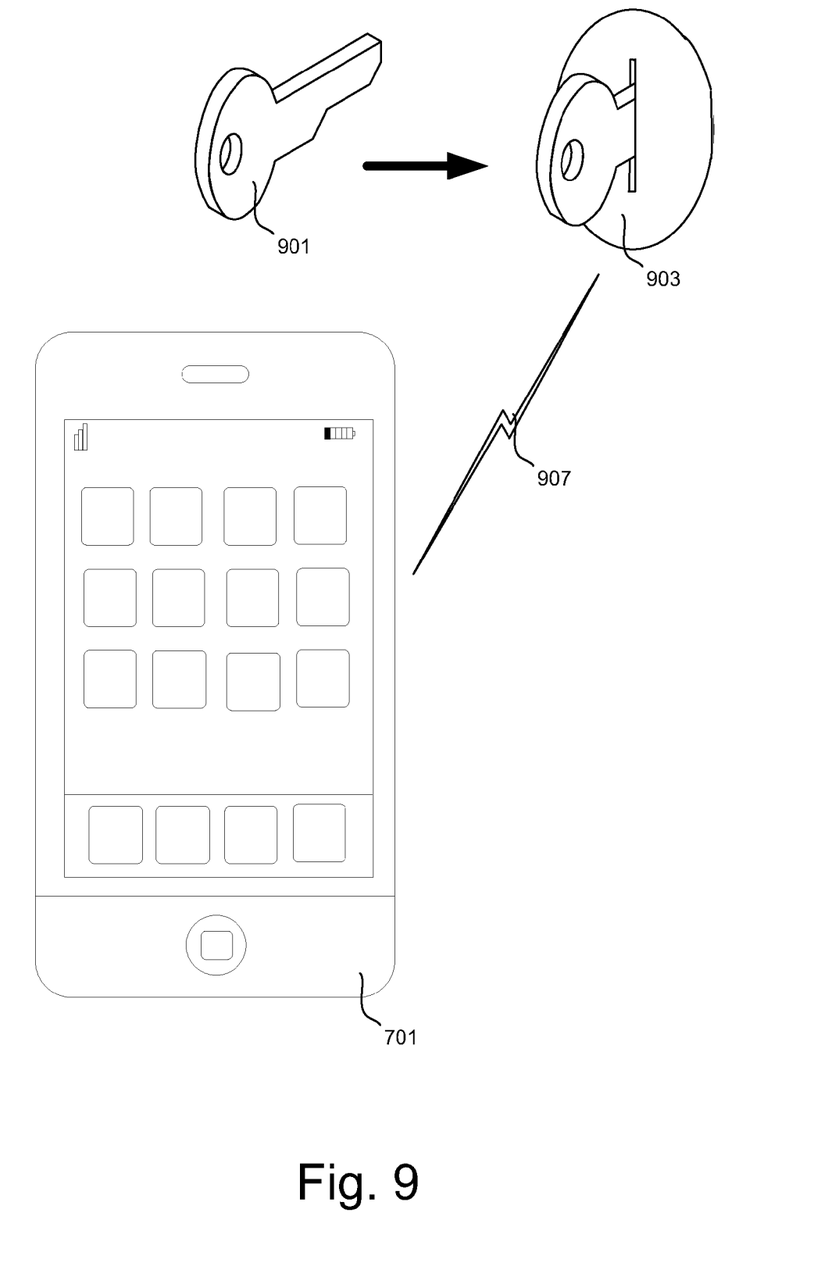
FIG. 9 is a diagram illustrating the communication to the mobile device from a vehicle once a driver of the vehicle has put the key in the ignition of the vehicle according to systems and methods for automatically disabling mobile device usage while driving.

Referring next to FIG. 9, shown is a diagram illustrating the communication to the mobile device from a vehicle once a driver of the vehicle has put the key in the ignition of the vehicle according to systems and methods for automatically disabling mobile device usage while driving. Shown are a vehicle key 901, the vehicle key 901 being inserted into the ignition 903 of an automobile, a mobile device 701, and a wireless communication signal 907 being sent to the mobile device 701 upon insertion of the key 901 into the ignition 903. The wireless communication signal 907 may be a signal to the mobile device 701 to initiate or active the procedures for monitoring of the speed of the mobile device 701 as described above via an accelerometer on or in the mobile device 701 and subsequent disabling of mobile device 701 functionality as described above if the speed of the mobile device exceeds a predetermined threshold. In this way, the customer or user of the mobile device will not have its functionality disabled when riding in taxis, airplanes, public transportation and in others' automobiles. The mobile device 701 may be programmed to recognize particular signals from particular vehicles or particular keys 901 using identifiers within the signal indicating which vehicle or key 901 the signal is originating from. For example, the signal may be sent via a radio frequency identifier chip embedded within the key 901 or vehicle that is triggered to transmit once to the key is inserted into the vehicle ignition 903 (e.g. via an electrical contact being made between the key 901 and the vehicle ignition 903). Also, if the automobile is started using electronic authentication means such as a code being entered or received by the vehicle, reception of the code to start the vehicle may also trigger the transmission of the signal 907 to the mobile device 701 to initiate the procedures for monitoring of the speed of the mobile device 701 as described above.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system implemented on one or more processors for automatically disabling mobile device usage while driving comprising:
   at least one subsystem configured for determining whether a mobile device is traveling at a speed greater than a predetermined threshold and maintaining a record of the determination;
   at least one subsystem configured for disabling a functionality of the mobile device if it is determined that the mobile device is traveling at a speed greater than the predetermined threshold; and
   at least one subsystem for automatically relaying a message to a third party indicating the functionality is disabled.

2. The system of claim 1, wherein the at least one subsystem configured for determining whether a mobile device is traveling at a speed greater than a predetermined threshold comprises:
   at least one subsystem configured for receiving output data from an accelerometer on the mobile device; and
   at least one subsystem configured for using said data to determine a current speed of the mobile device.

3. The system of claim 1, wherein the at least one subsystem configured for disabling a functionality of the mobile device comprises at least one subsystem configured for switching off the functionality internally within the mobile device if it is determined that the mobile device is traveling at a speed greater than the predetermined threshold.

4. The system of claim 1, wherein the at least one subsystem configured for disabling a functionality of the mobile device comprises at least one subsystem configured for blocking a transmission from the mobile device at a mobile device switching center if it is determined that the mobile device is traveling at a speed greater than the predetermined threshold by information received at the mobile device switching center.

5. The system of claim 1, wherein the disabled functionality of the mobile device is one or more of the following: voice, text messaging, multimedia messaging service, email, web browsing, chat functionality, video playback, sound, camera functionality, airplane mode, mobile device power, and all mobile device functionality.

6. The system of claim 1, further comprising:
at least one subsystem configured for determining whether the mobile device is traveling at a speed less than a predetermined threshold; and
at least one subsystem configured for enabling the disabled functionality if it is determined that the mobile device is traveling at a speed less than the predetermined threshold.

7. The system of claim 1, further comprising at least one subsystem configured for communicating information regarding whether the mobile device is traveling at a speed greater than a predetermined threshold to an insurance company.

8. A non-transitory computer readable medium for automatically disabling mobile device usage while driving comprising computer executable instructions for:
determining whether a mobile device is traveling at a speed greater than a predetermined threshold;
determining whether there is a transmission in progress on the mobile device if it is determined that the mobile device is traveling at a speed greater than the predetermined threshold;
maintaining a record of the speed and transmission determinations; and
playing an audio warning on the mobile device if it is determined that there is a transmission in progress on the mobile while the mobile device is traveling at a speed greater than the predetermined threshold.

9. The non-transitory computer readable medium of claim 8, wherein the transmission in progress is a telephone call.

10. The non-transitory computer readable medium of claim 8, further comprising computer executable instructions for disabling a functionality of the mobile device if it is determined that the mobile device is traveling at a speed greater than the predetermined threshold.

11. The non-transitory computer readable medium of claim 10, further comprising computer executable instructions for giving the user of the mobile device a predetermined time limit in the audio warning before disabling the functionality of the mobile device.

12. The non-transitory computer readable medium of claim 10, further comprising computer executable instructions for:
determining whether the mobile device is traveling at a speed less than a predetermined threshold; and
enabling the disabled functionality if it is determined that the mobile device is traveling at a speed less than the predetermined threshold.

13. The non-transitory computer readable medium of claim 12, further comprising computer executable instructions for displaying a notification message on the mobile device indicating functionality is restored before at a point of the enabling of the functionality.

14. The non-transitory computer readable medium of claim 10, wherein the disabled functionality of the mobile device is one or more of the following: voice, text messaging, multimedia messaging service, email, web browsing, chat functionality, video playback, sound, camera functionality, airplane mode, mobile device power, and all mobile device functionality.

15. A system implemented on one or more processors for automatically disabling mobile device usage while driving comprising:
at least one subsystem configured for receiving information at an insurance provider regarding whether the mobile device is traveling at a speed greater than a predetermined threshold;
at least one subsystem configured for automatically adjusting an automobile insurance premium based on said information regarding whether the mobile device is traveling at a speed greater than a predetermined threshold; and
at least one subsystem configured for enabling a feature on the mobile device for determining whether a mobile device is traveling at a speed greater than a predetermined threshold based on information received at the insurance provider regarding whether an automobile key associated with the mobile device is inserted into an automobile ignition and maintaining a record of the speed determination and automobile key insertion information.

16. The system of claim 15, wherein the information comprises information regarding a frequency that the cell phone was traveling greater than a predetermined threshold.

17. The system of claim 15, wherein the at least one subsystem configured for automatically adjusting an automobile insurance premium comprises:
at least one subsystem configured for automatically updating an insurance premium in a customer database if a mobile device associated with the customer was traveling at a speed greater than a predetermined threshold over a predetermined period of time; and
at least one subsystem configured for billing the customer according to the updated insurance premium.

18. The system of claim 15, further comprising at least one subsystem configured for automatically providing an insurance premium discount for a customer who subscribes to having their mobile device monitored to determine whether the mobile device is traveling at a speed greater than a predetermined threshold.

19. The system of claim 18, further comprising at least one subsystem configured for obtaining information regarding whether a customer has subscribed to having their mobile device monitored to determine whether the mobile device is traveling at a speed greater than a predetermined threshold from a bill payment system of the insurance provider.

20. The system of claim 15, wherein the received information at the insurance provider regarding whether the mobile device is traveling at a speed greater than a predetermined threshold originates from an accelerometer in the mobile device.

21. A non-transitory computer readable medium for automatically disabling mobile device usage while driving comprising computer executable instructions for:
enabling a feature on a mobile device for determining whether a mobile device is traveling at a speed greater than a predetermined threshold based on whether an automobile key associated with the mobile device is inserted into an automobile ignition and maintaining a record of the speed determination and automobile key insertion information; and
determining whether the mobile device is traveling at a speed greater than a predetermined threshold if the feature on the mobile device for determining whether a mobile device is traveling at a speed greater than a predetermined threshold is enabled.

22. The non-transitory computer readable medium of claim 21, further comprising computer executable instructions for communicating information to an insurance provider regarding whether the mobile device is traveling at a speed greater than a predetermined threshold.

23. The non-transitory computer readable medium of claim 21, further comprising computer executable instructions for disabling a functionality of the mobile device if it is determined that the mobile device is traveling at a speed greater than the predetermined threshold.

24. The non-transitory computer readable medium of claim 23, wherein the computer executable instructions for disabling a functionality of the mobile device comprise computer executable instructions for switching off the functionality internally within the mobile device if it is determined that the mobile device is traveling at a speed greater than the predetermined threshold.

25. The non-transitory computer readable medium of claim 21, wherein the computer executable instructions for disabling a functionality of the mobile device comprise computer executable instructions for blocking a transmission from the mobile device at a mobile device switching center if it is determined that the mobile device is traveling at a speed greater than the predetermined threshold by information received at the mobile device switching center.

26. The non-transitory computer readable medium of claim 21, further comprising computer executable instructions for sending a notification to a device of a user remote from a user of the mobile device if it is determined that the mobile device is traveling at a speed greater than the predetermined threshold.

27. The non-transitory computer readable medium of claim 21, wherein the computer executable instructions for determining whether a mobile device is traveling at a speed greater than a predetermined threshold comprise:
    computer executable instructions for receiving output data from an accelerometer on the mobile device; and
    computer executable instructions for using said data to determine a current speed of the mobile device.

\* \* \* \* \*